US005841464A

United States Patent [19]

Phillips

[11] Patent Number: 5,841,464

[45] Date of Patent: Nov. 24, 1998

[54] APPARATUS AND METHOD FOR MAKING GRAPHIC PRODUCTS BY LASER THERMAL TRANSFER

[75] Inventor: Raymond Phillips, Portland, Conn.

[73] Assignee: Gerber Scientific Products, Inc., Manchester, Conn.

[21] Appl. No.: 548,235

[22] Filed: Oct. 25, 1995

[51] Int. Cl.[6] .................................. B41J 2/47; B41J 3/20; G01D 6/14

[52] U.S. Cl. ........................... 347/253; 347/225; 347/264

[58] Field of Search ..................................... 347/225, 264, 347/234, 258, 232, 251, 253, 240

[56] References Cited

U.S. PATENT DOCUMENTS

| | | | |
|---|---|---|---|
| 4,059,833 | 11/1977 | Kitamura et al. | 347/261 |
| 4,133,600 | 1/1979 | Russell et al. | 369/103 |
| 4,580,142 | 4/1986 | Mastsushita et al. | 347/176 |
| 4,804,977 | 2/1989 | Long | 347/239 |
| 4,809,025 | 2/1989 | Noguchi | 347/261 |
| 4,926,348 | 5/1990 | Francis | 347/237 |
| 4,959,663 | 9/1990 | Chiba et al. | 347/225 |
| 4,975,714 | 12/1990 | Rose | 347/256 |
| 4,977,412 | 12/1990 | Komiri et al. | 347/257 |
| 5,051,757 | 9/1991 | Hasegawa | 347/258 |
| 5,064,260 | 11/1991 | Shiraishi | 347/258 |
| 5,072,114 | 12/1991 | Takada | 347/235 |
| 5,087,927 | 2/1992 | Thomas et al. | 347/258 |
| 5,129,321 | 7/1992 | Fadner | 101/467 |
| 5,220,356 | 6/1993 | Yaginuma | 347/225 |
| 5,278,576 | 1/1994 | Kaszczuk et al. | 347/232 |
| 5,298,922 | 3/1994 | Merkle et al. | 347/232 |
| 5,323,180 | 6/1994 | Kuberka et al. | 347/215 |
| 5,325,216 | 6/1994 | AuYeung | 347/225 |
| 5,342,817 | 8/1994 | Sarraf | 347/171 |
| 5,401,618 | 3/1995 | Chapman et al. | 347/232 |
| 5,414,451 | 5/1995 | Sugiyama et al. | 347/258 |

FOREIGN PATENT DOCUMENTS

| | | | |
|---|---|---|---|
| 0137559 | 4/1985 | European Pat. Off. . | |
| 0605334 | 7/1994 | European Pat. Off. . | |
| 0607539 | 7/1994 | European Pat. Off. . | |
| 2442430 | 3/1975 | Germany . | |
| 3623487 | 2/1988 | Germany . | |
| 57-126676 | 8/1982 | Japan . | |
| 59-179355 | 10/1984 | Japan . | |
| 61-112665 | 5/1986 | Japan . | |
| 62-128277 | 6/1987 | Japan | H04N 1/23 |
| 63-182136 | 11/1988 | Japan | B41J 3/20 |
| 02081644 | 3/1990 | Japan . | |
| 04128053 | 4/1990 | Japan . | |
| 3-222762 | 10/1991 | Japan | B41J 2/36 |

OTHER PUBLICATIONS

European Search Report from corresponding European Application No. 96307410.9 citing the above–listed references.

*Primary Examiner*—Peter S. Wong
*Assistant Examiner*—Bao Q. Vu
*Attorney, Agent, or Firm*—McCormick, Paulding & Huber

[57] ABSTRACT

An apparatus and method for printing graphic images by laser thermal transfer uses a laser source and a programmable pulse generator to transmit a pulsed infrared laser beam in accordance with a printing program of image data to print graphic images on sheet material. The pulsed laser beam is transmitted through a focusing lens, and the focused beam is in turn scanned by a scanning device through a laser window assembly into an ink web along a line of laser impingement. The ink web contains a layer of printing ink and overlies the sheet material supported on a roller platen. The laser window presses the ink web into the sheet material against the roller platen along the line of laser impingement to facilitate the transfer of ink from the web to the sheet in accordance with the printing program of image data. The focusing lens and laser window are highly transmissive at the selected wavelength of the laser beam to permit the passage of substantially all radiation into the layer of printing ink along the line of laser impingement.

31 Claims, 4 Drawing Sheets

FIG. 1
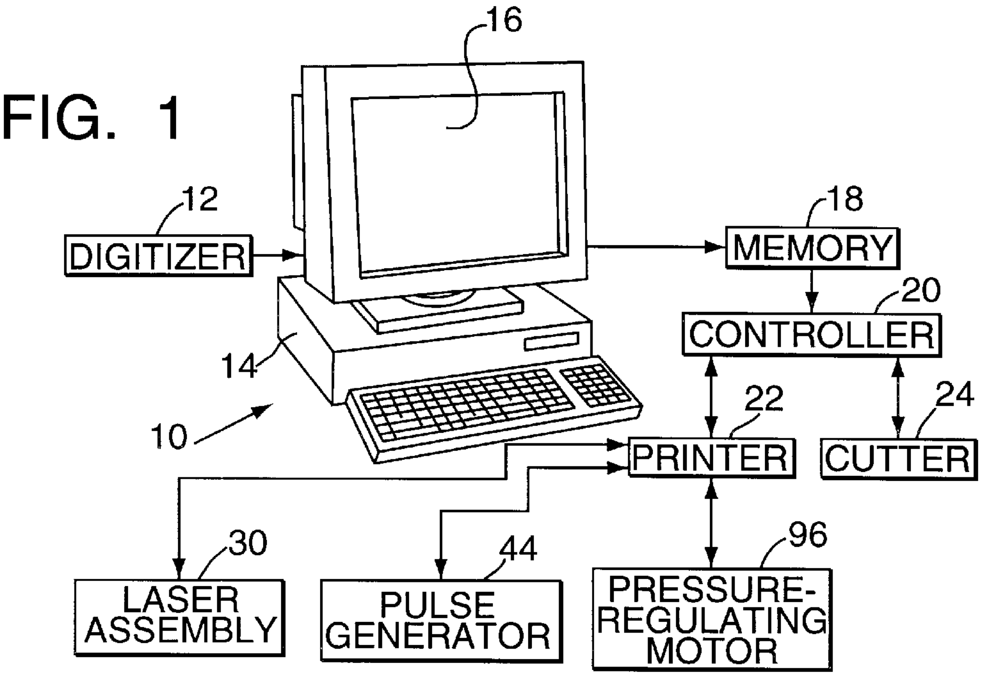
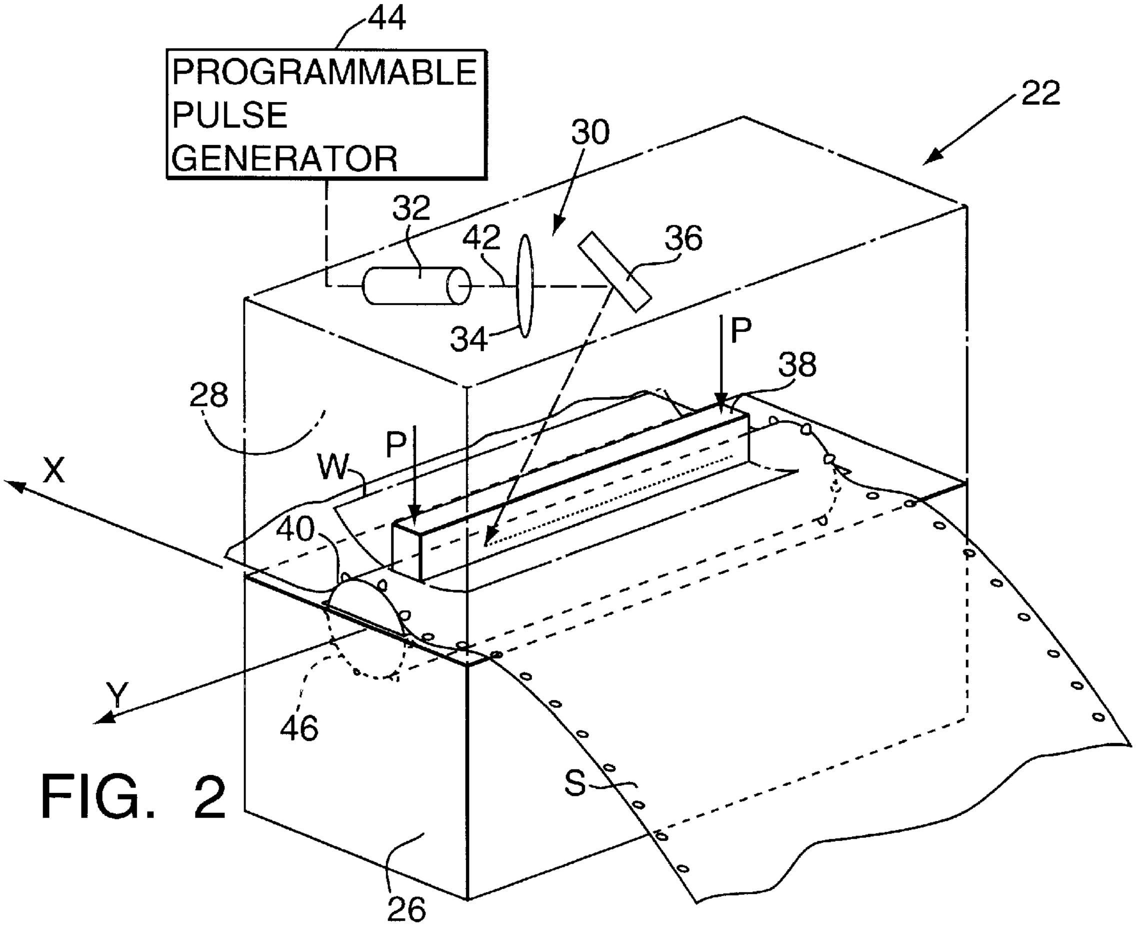
FIG. 2

APPARATUS AND METHOD FOR MAKING GRAPHIC PRODUCTS BY LASER THERMAL TRANSFER

FIELD OF THE INVENTION

The present invention relates to an apparatus and method for making graphic products on sheet material, and more particularly, to an apparatus and method employing a laser source to transfer ink from an ink web to a strip of sheet material for printing graphic images on the sheet material.

BACKGROUND INFORMATION

There are several commercially-available systems today that employ thermal print heads to transfer ink from an ink web to a strip of sheet material to produce graphic products with multicolored or enhanced graphic images for signs and like displays. One such commercially-successful system is manufactured and sold by Gerber Scientific Products, Inc. of Windsor Locks, Connecticut under the trademark GERBER EDGE™. The GERBER EDGE™ is typically used to print vinyl graphics for signs or like displays, wherein multicolored or enhanced graphic images are printed on a vinyl sheet, and the sheet is cut along the periphery of the graphic images to create a sign or like display. The system uses a thermal print head to print the graphic images on the sheet, and a cutter to cut the sheet along a peripheral edge surrounding the graphic images. The print head and the cutter are controlled by a microprocessor having a common data base so that the printed images and the cut edges correspond positionally in the final graphic product.

A roller platen carrying the vinyl sheet is mounted below the print head, and a removable cassette carrying a donor web bearing transfer ink is mounted adjacent to the print head so that the donor web is interposed between the print head and the vinyl sheet. Heating elements of the print head are selectively energized to transfer ink from the donor web to the vinyl sheet in accordance with commands from the microprocessor to create graphic images on the vinyl sheet. Each cassette carries a donor web bearing a single color of transfer ink, and the cassettes are interchanged to create multicolored images, different shades and/or colors. The roller platen and vinyl sheet are slewed back and forth during printing operations to apply the different color inks.

The GERBER EDGE™ system described above is disclosed in U.S. patent application Ser. No. 08/007,662, filed Jan. 22, 1993, entitled "Method And Apparatus For Making A Graphic Product", which is assigned to the Assignee of the present invention, and is hereby expressly incorporated by reference as part of the present disclosure.

In such prior art apparatus, the thermal print head typically has a linear array of heating elements densely packed along a line of contact with the sheet material. With higher density heating elements, graphic images of higher resolution can be created. A typical thermal print head may have a density of 300 elements per inch, although higher density print heads are available. Accordingly, although relatively high resolution graphic images can be created with prior art apparatus employing thermal print heads, the resolution is limited by the size of the heating elements and the density of the array.

In addition, the width of the graphic images in such prior art printing apparatus is frequently limited by the width of the thermal print head employed. Although some prior art printing apparatus have thermal print heads that are movable in the lateral direction of the sheet material, or comprise more than one print head mounted side by side to print graphic images of increased width, this involves added complexity and expense.

Thermal print heads also typically require history control in order to print graphic images of relatively high resolution and quality. The heating elements of a thermal print head retain heat immediately after being turned off, and the actuation of a heating element will typically increase the temperature of one or more adjacent heating elements not actuated. Accordingly, apparatus employing thermal print heads often require an automatic adjustment and precise control of the pulse width applied to actuate each heating element in order to compensate for such temperature effects and thereby maintain consistent dot size and produce graphic images of high resolution and quality.

It is an object of the present invention to overcome the drawbacks and disadvantages associated with prior art apparatus and methods employing thermal print heads for printing graphic products on sheet material.

SUMMARY OF THE INVENTION

The present invention is directed to an apparatus and method for printing graphic products on sheet material by laser thermal transfer. The apparatus of the invention comprises a platen supporting the sheet material, which may be, for example, a vinyl or like polymeric material supported on a releasable backing, and an ink web overlying the sheet material on the platen and bearing a printing ink for selectively transferring the ink to the sheet material. A laser source of the apparatus transmits a beam of radiation at a selected wavelength, preferably in the infrared, along a line of laser impingement into the ink web supported on the sheet material for selectively heating and in turn transferring ink from the web to the sheet in accordance with a printing program of image data for printing graphic images on the sheet. A laser window is mounted over the platen and pressed into engagement with the ink web against the sheet material on the platen along the line of laser impingement to facilitate the transfer of ink from the web to the sheet. The laser window is preferably highly transmissive, for example, approximately 90% transmissive, at the selected wavelength of the laser beam to thereby permit the beam to pass through the window and into the ink web to print the graphic images on the sheet.

One advantage of the apparatus and method of the present invention, is that the resolution of the printed images is not limited by the size and density of the heating elements as in prior art apparatus employing thermal print heads, but rather the laser beam is extremely narrow and precise and thereby permits the apparatus to print graphic images of substantially increased resolution. In addition, the laser source used in accordance with the apparatus and method of the present invention permits precise control over the printing parameters by allowing, for example, pixel-to-pixel addressibility and dot size control, to thereby print graphic images of high resolution and quality. Moreover, the width of the graphic images is not limited by the width of a thermal print head as in the prior art apparatus described above, but rather may be adjusted by controlling the scan width of the laser beam.

Other objects and advantages of the apparatus and method of the present invention will become apparent in view of the following detailed description and accompanying drawings.

BRIEF DESCRIPTION OF THE DRAWINGS

FIG. 1 is a schematic diagram illustrating a system embodying the present invention for printing and cutting signs and other graphic products.

FIG. 2 is a schematic illustration of a printing apparatus embodying the present invention for printing the signs and other graphic products by laser thermal transfer.

DETAILED DESCRIPTION OF A PREFERRED EMBODIMENT

Figure 3:
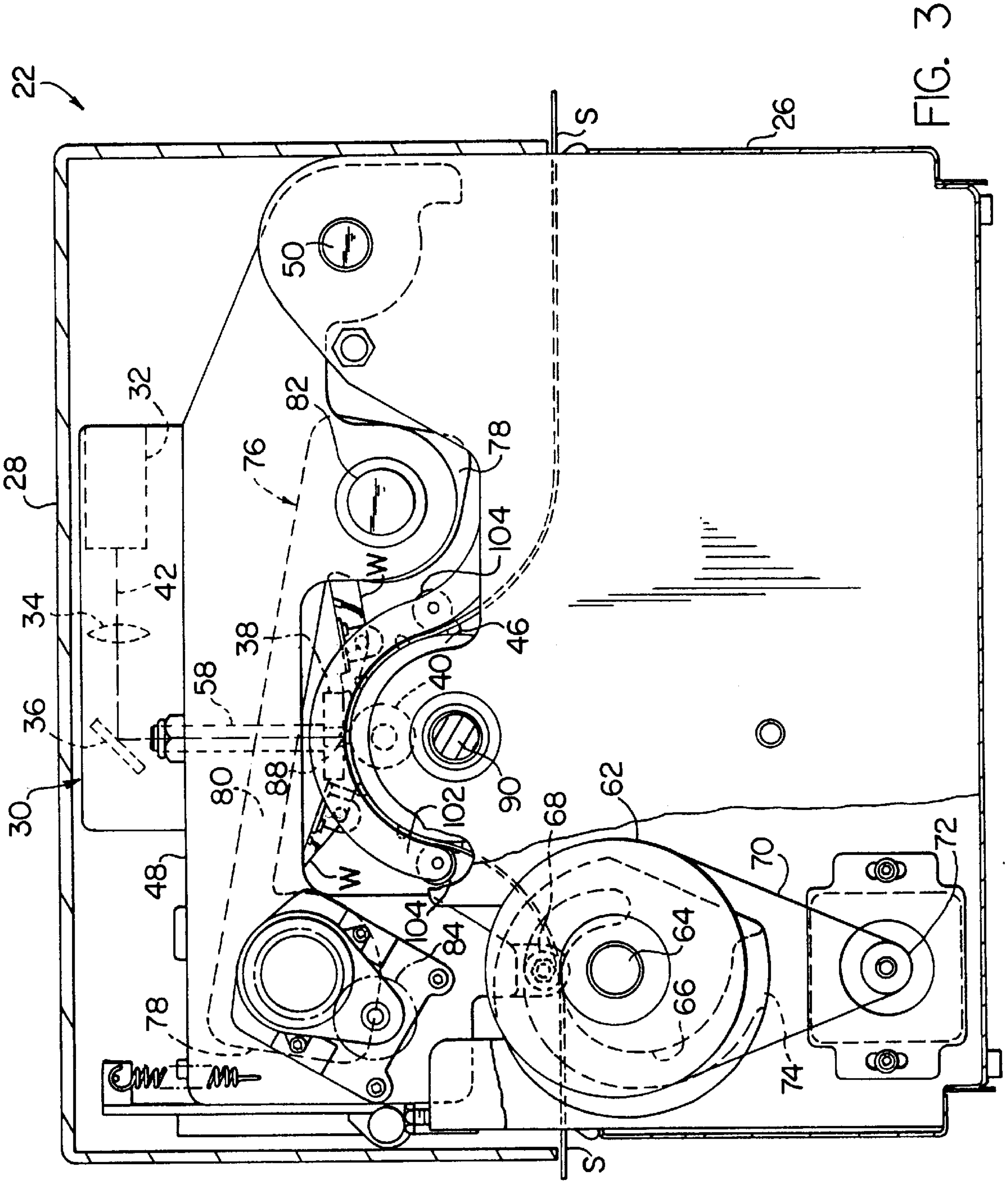
FIG. 3 is a more detailed, side elevational view of the printing apparatus of FIG. 2 with portions broken away to show the internal structure.

In FIG. 1, an apparatus embodying the present invention for making graphic products with multicolored and/or enhanced graphic images is indicated generally by the reference numeral 10. The apparatus of FIG. 1 enables a graphic product to be created and produced with enhancements from a data base within which the printed and cut features of the product are commonly based. The apparatus 10 includes a digitizer 12 or other data input device which transmits data to a computer 14 defining at least the peripheral edges of the graphic product and possibly internal edges as well. The computer 14 displays the image data defining the edges as an image on a monitor 16. Then, printing enhancements from a special enhancement program within the computer's memory 18 for creating and printing graphic images are added within the edges of the displayed image as the operator or composer desires by employing a keyboard, mouse and/or like input device.

From the image data defining an enhanced graphic product, the computer 14 generates at least one printing program for operating a controller 20 to control a printing apparatus 22 to print the prepared graphic images on a sheet material. If desired, the computer may also generate a cutting program for operating the controller 20 to control a cutting apparatus 24 to cut the sheet material around the graphic images and create the final graphic product.

In a preferred embodiment of the present invention, the sheet material is a vinyl secured by a pressure-sensitive adhesive on a releasable backing. One such vinyl is sold by the Assignee of this invention under the trademark SCOTCHCAL™ of the 3M Company. As will be recognized by those skilled in the pertinent art, however, numerous other types of sheet material may equally be employed, such as paper and other types of polymeric sheets, including polyvinyl chloride (PVC) and polycarbonate sheets. Similarly, the sheet material may be supplied in any length on rolls, in flat sheets, or as otherwise desired.

The printing apparatus 22 prints the graphic images on the sheet material, and the printed sheet may be transferred to the cutting apparatus 24 which is operated by the controller 20 to cut the sheet along the peripheral edges of the graphic images and any internal edges, if necessary, in accordance with the cutting program. With vinyl sheets as described above, after weeding to remove unwanted vinyl material within or around the printed images, the vinyl forming the enhanced image is lifted from the underlying backing and may be attached to a sign board, window or other object for display.

A suitable cutting apparatus 24 for carrying out the cutting operation on sheets of vinyl or other material is disclosed in U.S. Pat. Nos. 4,467,525, 4,799,172 and 4,834,276, all owned by the Assignee of the present invention.

Turning to FIG. 2, a unique printing apparatus 22 embodying the present invention for carrying out the printing operation comprises a base assembly 26 and a cover assembly 28 (shown in broken lines) pivotally mounted to the base. The cover assembly 28 supports a laser assembly 30 including a laser source 32, a focusing lens 34 and a scanning device 36. A laser window assembly 38, which is highly transmissive at the selected wavelength of the laser source 32, is supported by the cover 28 above a roller platen 40, which is in turn rotatably mounted on the base assembly 26. A strip of sheet material S and an ink web W overlying the strip S (shown in broken lines) are driven between the roller platen 40 and window assembly 38, and the web W bears a printing ink for printing graphic images on the top surface of the sheet S. A programmable pulse generator 44 is coupled between the controller 20 and the laser source 32 to control the pulse width of a laser beam 42 transmitted by the laser source 32 to print graphic images on the sheet material S.

Accordingly, as illustrated schematically in FIG. 2, the programmable pulse generator 44 controls the pulse width of the laser beam 42 in accordance with the printing program of image data received from the computer 14, and the pulsed beam is in turn focused by focusing lens 34 onto the scanning device 36. The scanning device 36 scans the pulsed beam 42 through the window assembly 38 along a line of laser impingement extending in the illustrated y-coordinate direction across the portion of the ink web W engaging the sheet material S on the roller platen. As the pulsed beam of radiation 42 impinges upon the ink web W, precise portions of the ink absorb the radiation and are thereby heated and released from the ink web and transferred to the sheet material S along the line of laser impingement in accordance with the printing program of image data. As indicated by the downwardly-pointing arrows designated "P" in FIG. 2, the window assembly 38 presses the ink web W against the sheet material S directly on the line of laser impingement in order to facilitate the transfer of ink from the web to the sheet and to press the web and sheet against the roller platen for driving the web and sheet in the illustrated x-coordinate direction, as is described further below.

As will be recognized by those skilled in the pertinent art, the laser wavelength, energy and pulse width of the beam 42 are selected to effect a transfer of ink from the web W to the sheet material S in accordance with the printing program to create the desired graphic products on the sheet material. In addition, the focusing lens 34, window assembly 38, and the backing materials, if any, of the ink web W are each selected to be at least approximately 70% transmissive at the selected wavelength of the laser beam 42, and preferably about 90% transmissive at the selected wavelength, in order to minimize the energy requirements of the laser source 32 and efficiently transfer the radiation into the ink web W to create the graphic products. The ink material of the web W, on the other hand, is highly absorbent at the selected wavelength of the laser beam 42 in order to absorb substantially all radiation transmitted along the line of laser impingement.

In the embodiment of the present invention illustrated, the laser source 32 is a $CO_2$ laser, which preferably generates approximately 30 Watts of energy on average in the infrared. In the preferred embodiment, the selected wavelength of the beam 12 is approximately 10.6 microns. At this wavelength, both zinc selenide (ZnSe) and sodium chloride (NaCl) are highly transmissive (approximately 90%), and are therefore each appropriate materials for constructing the transmissive portions of the focusing lens 34 and window assembly 38.

For a given power and wavelength of the radiation beam 42, the pulse width will be selected in such a way which is inversely proportional to the overall transmissivity of the components through which the beam is transmitted, i.e., the overall transmissivity of the focusing lens 34, window assembly 38, and any backing material of the ink web W. Accordingly, the greater the overall transmissivity of these components at the selected wavelength, the shorter will be the pulse width required to effect a transfer of ink from the web to the sheet material. Similarly, the greater the absorbency of the ink material at the selected wavelength, the shorter will be the pulse width required to effect a transfer of ink to the sheet material. Accordingly, for the same printing apparatus 22, the pulse width of the laser beam 42 may be varied from one type of ink web to the next.

A typical ink web W is a multi-layer construction having a resin and/or wax layer comprising the printing ink and supported on one or more backing layers, including, for example, a release layer superimposed over the resin/wax layer, a carrier layer superimposed over the release layer, and a back coat superimposed over the carrier layer to provide a low-friction surface for engaging the window assembly 38. With the radiation beam as described above (10.6 microns, 30 $W_{avg.}$) transmitted into a wax-based ink web, a pulse width of approximately 50 ms created an effective ink transfer from the web to a strip of vinyl sheet material. The same beam transmitted into a resin-based ink web, on the other hand, required a longer pulse width of approximately 100 to 150 ms to create an effective ink transfer onto a strip of vinyl sheet material. Accordingly, for a beam of this wavelength and energy, employed in the preferred embodiment of the printing apparatus with a typical ink web as described herein, the pulse width should be within the range of approximately 50 to 250 ms for creating effective ink transfer.

As will be recognized by those skilled in the pertinent art, the scanning device 36 may be any of numerous known devices for scanning the laser beam 42 along the line of laser impingement, such as a rotating mirror or galvanometer, including, for example, a truncated mirror, a polygonal mirror or a pyramidal mirror. The scanning device 36 is coupled to the controller 20 of FIG. 1 in a manner known to those of ordinary skill in the pertinent art to control its operation, including the rotational position and speed of the scanning device and the scan width of the laser beam 42. The focusing lens 34 may likewise be any of numerous known beam focusing devices constructed of a material highly transmissive at the selected wavelength of the laser beam 42, such as zinc selenide or sodium chloride as described above in the preferred embodiment. In addition, the laser source, and wavelength, energy and pulse width of the laser beam 42, along with the preferred materials for construction described herein are only exemplary, and numerous other types of laser sources and materials for construction may be substituted for those described herein without departing from the scope of the invention.

As also shown in FIG. 2, the printing apparatus 22 may utilize sprockets 46 or other suitable registration means to engage corresponding feed holes H in the sheet material S. The feed holes H may extend along each longitudinal edge of a strip S of sheet material in order to register and steer the sheet material driven between the roller platen 40 and window assembly 38. Correspondingly, the cutting apparatus 24 may also include a set of sprockets to engage the same series of feed holes H during the cutting operation to likewise register the sheet material with a cutting blade. Accordingly, the registration of the cut edges of the graphic product with the printed image is insured in the longitudinal direction. Since the graphic image is absolutely fixed both transversely and longitudinally on the strip S relative to the feed holes H, the feed holes are a proper reference for the image in both the printing and cutting operations.

The sheet material S may be supplied on a roll (not shown) supported on the back side of the base assembly 26, and after the sheet passes through the printing apparatus 22 where the printing operation takes place, it is discharged freely at the front side of the apparatus as shown, or may be retrieved on a take-up reel if desired.

Figure 4:
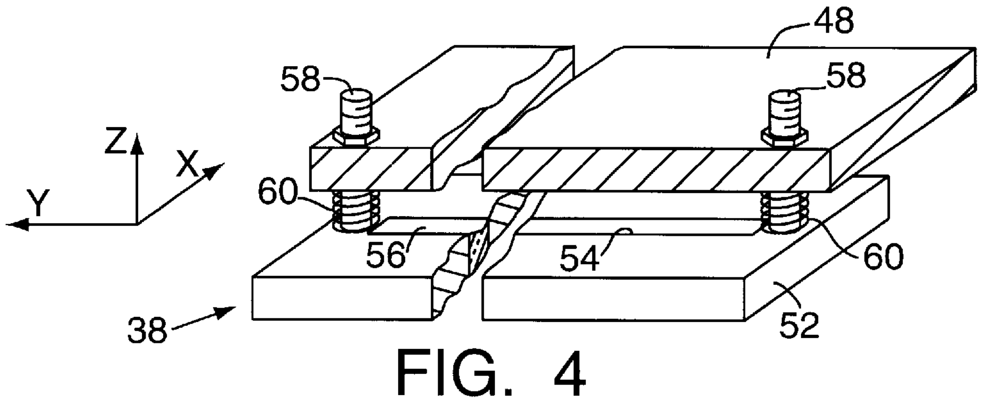
FIG. 4 is a perspective view of the laser window assembly of the printing apparatus of FIG. 2 and showing the structure for resiliently mounting the window assembly to an upper support frame of the apparatus.

With reference to FIG. 3, the window assembly 38 is mounted to an upper support frame 48 of the printing apparatus, which is pivotally mounted on an axle 50 at the back side of the base assembly 26. Accordingly, the upper support frame 48 and the window assembly 38 are pivoted toward and away from the roller platen upon closing and opening the cover 28, respectively. As shown best in FIG. 4, the window assembly 38 comprises a frame 52 defining a window slot 54 formed through the frame and extending in its elongated direction along the line of laser impingement. The slot 54 is filled with a window material to form a laser window 56 which is highly transmissive at the selected wavelength of the laser beam 42 to permit passage of the beam through the window along the line of laser impingement. Accordingly, for the preferred laser beam as described above (10.6 microns, 30 $W_{avg.}$), the window material 56 may be either sodium chloride (NaCl) or zinc selenide (ZnSe).

The window assembly 38 is mounted to the upper support frame 48 by a series of bolts 58; and a respective coil spring 60 surrounds each bolt 58 and is interposed between the window frame 52 and the support frame 48. The coil springs 60 apply a pressure downwardly against the window frame 52, and in turn resiliently press the window 56 against the ink web W and sheet material S on the roller platen 40 directly on the line of laser impingement, thus forming a linear zone of contact on the ink web along the line of laser impingement. As will be recognized by those skilled in the pertinent art, the top and bottom surfaces of the laser window 56 may be coated with an anti-reflection coating to prevent reflection or scattering of the laser beam 42 upon transmission through the window. Similarly, it may be necessary to apply a suitable hard coat on the bottom side of the laser window 56 (which is likewise transmissive at the selected wavelength of the beam 42), to prevent the window from being scratched or otherwise marred by dust particles or debris during printing operations.

In order to regulate the amount of pressure applied by the window assembly 38 to the ink web W and sheet material S on the line of laser impingement, the projecting or cantilevered end of the support frame 48 is moved up and down relative to the roller platen 40 by a pressure-regulating mechanism that is adjusted by the controller 20. As shown in FIG. 3, the pressure-regulating mechanism includes a cam 62 rotatably mounted to the base assembly 26 by a shaft 64. The cam 62 defines a spiral cam slot 66 (shown in phantom) which receives and engages a cam follower 68 (also shown in phantom) connected to the projecting end of the support frame 48. The cam 62 is coupled by a toothed drive belt 70 to a pressure-regulating step motor 72.

Accordingly, as the cam 62 is rotated by the pressure-regulating step motor 72, the relative movement of the cam follower 68 within the cam slot 66 causes the support frame 48 and window assembly 38 to move up or down, depending upon the direction of rotation of the cam, and thereby adjust the pressure applied to the ink web W and sheet material S on the line of laser impingement. The pressure-regulating motor 72 is coupled to the controller 20, which in turn controls rotation of the cam 62 to precisely set the pressure applied to the ink web and sheet material on the line of laser impingement.

As also shown in hidden lines in FIG. 3, the cam slot 66 defines an exit point 74 at the periphery of the cam 62, so that the cam follower 68 and correspondingly the support frame 48 can be lifted completely free of the cam when the controller 20 controls rotation of the cam to its upright position. The controller 20 also controls the position of the cam 62 to move the window assembly 38 into and out of contact with the ink web W and sheet material S. For example, at the end of a printing operation, or between application of ink webs bearing different colored inks, the controller 20 controls operation of the pressure-regulating motor 72 to drive the cam 62 to a position at which there is zero pressure between the window assembly and the roller platen. In addition, the window assembly 38 can be lifted away from the roller platen 40 so that the sheet material S can be slewed back and forth relative to the window assembly without making contact with the web W of printing ink.

As will also be recognized by those skilled in the pertinent art, the pressure-regulating motor 72 may be adjusted by the controller 20 in accordance with numerous printing parameters. For example, the pressure may be adjusted to affect the transfer of ink from the web to the sheet material depending upon the type of sheet material and/or the ink web employed. The pressure may likewise be adjusted to affect the force transmitted between the roller platen and the sheet material, or to affect the intensity or tone of the printed images. Accordingly, the adjustment of the pressure level can occur prior to or throughout a printing operation in accordance with print characteristics that are stored in the print program or are measured during a printing operation.

As also shown in FIG. 3, a replaceable cassette 76 is installed under the cover 28 and carries the ink web W, which is interposed between the window assembly 38 and sheet material S on the roller platen 40. A preferred construction of the cassette 76 and a mechanism for replaceably mounting the cassette to the upper support frame 48 are illustrated and described in detail in the above-mentioned co-pending patent application. Briefly, however, each cassette 76 is easily installed and removed from the upper support frame 48 when the cover assembly 28 is lifted to a fully-open position to, for example, replace a depleted cassette or select a different ink web for printing.

As shown in FIG. 3, each cassette 76 comprises two end shells 78 and two molded side rails 80 (one shown) extending between the end shells and defining a generally rectangular configuration with an opening in the center. The ink web W is attached on each end to spools (not shown) rotatably mounted and enclosed within each end shell 78, and the ink web is passed from one spool to the other through the central opening in the cassette. As shown in FIG. 3, the window assembly 38 passes downwardly into the central opening of the cassette 76 and the laser window 56 presses the ink web W onto the sheet material S forming a linear zone of contact directly on the line of laser impingement. A slip clutch or drag brake 82 is coupled to the supply spool of the cassette 76 to impose a frictional restraint on the spool as the ink web W is pulled off the spool.

As also shown in FIG. 3, a web drive motor 84 is coupled through a slip clutch (not shown) to the opposite or take-up spool of the cassette 76. The drive motor 84 is coupled to the controller 20, and when engaged it applies a torque to the take-up spool, and thus produces a uniform tension force on the ink web W. The web drive motor 84 is engaged only during printing operations, and the force applied to the ink web is limited by the slip clutch (not shown) so that the actual movement of the web is controlled by movement of the roller platen 40. Accordingly, the web W and sheet material S are pressed between the window 56 and roller platen 40 and move synchronously during printing operations. During non-printing operations, on the other hand, the controller 20 relieves the pressure applied by the window assembly 38 and de-energizes the web drive motor 84 so that when the sheet material S is slewed, the ink web neither moves, nor is it consumed.

The printing apparatus 22 preferably employs a platen drive to move the sheet material S relative to the window assembly 38 with encoded sprockets and/or an encoded sprocket shaft to maintain precise registration of the sheet material with the laser beam 42, as described, for example, in co-pending U.S. patent application Ser. No. 08/440,083, filed May 12, 1995, entitled "Apparatus For Making Graphic Products Having A Platen Drive With Encoded Sprockets", which is assigned to the Assignee of the present invention, and is hereby expressly incorporated by reference as part of the present disclosure.

Figure 5:
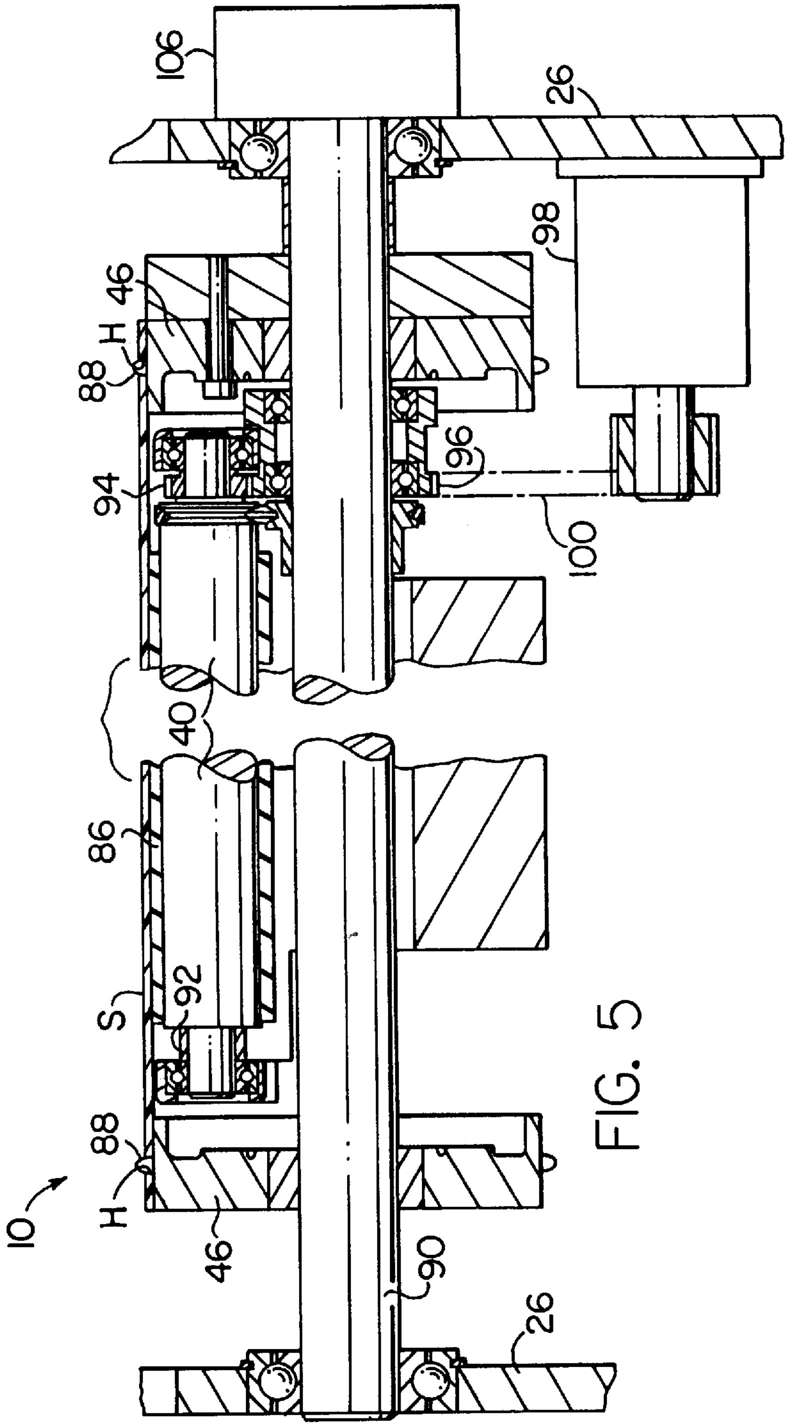
FIG. 5 is a fragmentary front view, in partial cross section of the printing apparatus of FIG. 3 showing the system for driving the sheet material and ink web between the roller platen and laser window assembly.

As shown in FIG. 5, the roller platen 40 includes a hard rubber sleeve 86 for engaging and driving the sheet material S. The polymeric material of the sleeve 86 is selected to provide a firm surface to support the sheet material S beneath the window assembly 38, and to enhance the frictional engagement of the platen with the backing of the strip to effectively drive the strip. A marginal edge portion of the sheet material S overlaps the rubber sleeve 86 of the roller platen at each end and is engaged by a respective registration sprocket 46. As shown typically in FIG. 5, each registration sprocket 46 includes a plurality sprocket pins 88, which are received within the feed holes H of the sheet material to guide and steer the sheet, and precisely maintain registration of the sheet as it is driven by the roller platen beneath the window assembly.

As also shown in FIG. 5, the registration sprockets 46 are each mounted to a common sprocket shaft 90, which is in turn rotatably mounted on each end to the base assembly 26. Each registration sprocket 46 is fixed to the shaft 90 in its rotational direction so that the sprockets rotate in sync with each other and the shaft, but may be slidably mounted in the axial direction of the shaft to permit lateral adjustment of the sprockets to accommodate sheet materials of different width.

As also shown in FIG. 5, the roller platen 40 is spaced adjacent and oriented parallel to the sprocket shaft 90, and is mounted on a drive shaft 92, which is in turn rotatably mounted to the base assembly 26. A platen drive gear 94 is fixedly mounted to the platen drive shaft 92, and is meshed with an idler gear 96 rotatably mounted to the sprocket shaft 90. A platen drive motor 98, which may be, for example, a step motor, is mounted to the base assembly 26, and is coupled through a suitable gear train 100 (shown schematically in broken lines) to the idler gear 96. Actuation of the platen drive motor 98 rotatably drives the idler gear 96, and in turn directly drives the platen drive gear 94 and roller platen 40. As will be recognized by those skilled in the pertinent art, other suitable means may be employed to drivingly connect the platen drive motor to the roller platen, such as a drive belt. A limited-slip belt 101 may also be coupled between the roller platen 40 and the sprocket shaft 90 to drive the sheet material independent of the ink web during non-printing operation.

With reference to FIG. 3, in order to keep the sheet material S fully engaged with approximately 180° of the registration sprockets 46, a pair of hold-down bails 102 (only one shown) straddle the pins 88 of each sprocket. The bails are pivotally suspended from the base assembly 26 on pins (not shown) so that the bails can be lifted away from the sprockets and allow a strip of sheet material S to be mounted on and removed from the sprocket and roller platen 40. Over-center springs (not shown) are preferably used to hold each bail 102 downwardly on the strip S and also permit lifting of the bails away from the sprockets during installation or removal of a strip. In addition, a pair of hold-down rollers 104 extend between the bails 102 at the supply, and discharge points of the roller platen 40. Thus, the feed holes H along each marginal edge of the sheet material S are threaded onto the sprockets 46 by lifting the bails, and are held firmly with the sprockets by lowering the bails.

Accordingly, the sheet material S and ink web W are pressed against the roller platen 40 by the window assembly 38 along substantially the entire length of the roller platen and directly on the line of laser impingement, and the sheet material is further maintained in conforming engagement with the roller platen by the hold-down rollers 104 and bail assemblies 102 to directly drive the sheet and ink web with the platen drive motor 98 and roller platen. The registration sprockets 46, on the other hand, engage the feed holes H to guide and steer the sheet material, and in turn prevent skewing of the sheet material under the driving force of the platen, and maintain precise registration of the sheet with the laser beam.

As also shown in FIG. 5, a positional sensor 106 is preferably mounted adjacent to the sprocket shaft 90 to track the rotational position of the registration sprockets 46 and thus the it position of the sheet material S engaged by the sprockets. The positional sensor 106 is also coupled to the controller 20 and transmits signals to a register in the controller indicative of the rotational direction and position of the sprocket shaft 90, and thus of the rotational direction and position of the registration sprockets 46 mounted to the shaft. As will be recognized by those skilled in the pertinent art, any of numerous known types of sensors may be employed, including, for example, a suitable resolver or encoder, such as an optical encoder, for encoding the registration sprockets or sprocket shaft and generating signals indicative of their rotational direction and position.

Accordingly, the controller 20 controls operation of the pulse generator 44 to in turn control the pulse width and transmission of the laser beam 42 in accordance with the printing program of image data and in response to the positional signals transmitted by the sensor 106 coupled with the image data. As will be recognized by those skilled in the pertinent art, the ink web and sheet material may be incrementally driven in the x-coordinate direction between printing successive lines of image data along the line of laser impingement, or may be continuously driven in the x-coordinate direction at variable speeds depending upon the availability of the image data in one or more data buffers (not shown). Because the feed holes H maintain precise registration of the sheet material with the print head, and the positional signals transmitted by the sensor 106 are based on the position of the sprockets 46 engaging the feed holes H, the graphic images are accurately printed on the sheet material in accordance with the printing program.

Figure 6:
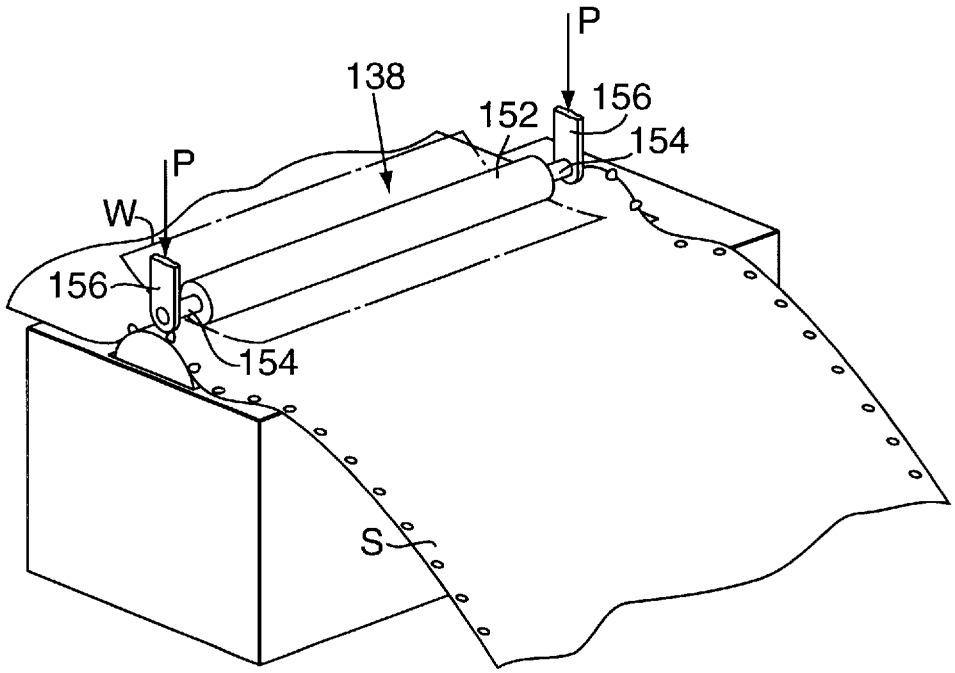
FIG. 6 is a perspective view of another embodiment of a laser window assembly for mounting in the printing apparatus of FIG. 2.

As will be recognized by those skilled in the pertinent art, the laser window assembly 38 may take numerous different configurations for purposes of performing the function of pressing the ink web W against the sheet material S and roller platen on the line of laser impingement in order to facilitate the transfer of ink from the web to the sheet in accordance with the present invention. For example, as shown in FIG. 6, another embodiment of the window assembly is indicated generally by the reference numeral 138, and is constructed in the form of a roller which is rotatably mounted on the cover assembly 28 over the roller platen 40. Like the window assembly 38 described above, the window assembly 138 is resiliently mounted by springs or like means (not shown) to the upper support frame 48 of the printing apparatus, and is movable with the cover 28 toward and away from the roller platen for pressing the ink web W against the sheet material S on the line of laser impingement.

As shown in FIG. 6, the window assembly 138 comprises a transmissive roller (or laser window) 152, which is rotatably mounted on each end by pins 154 and bearing assemblies (not shown) to a respective support arm 156. Each support arm 156 is in turn resiliently mounted to the upper support frame 48 of the printing apparatus by one or more bolts and associated springs as described above for the window assembly 38, or other suitable means for resiliently mounting. Accordingly, when the upper support frame 48 is moved downwardly toward the roller platen 40 by rotation of the cam 62 of FIG. 3, the transmissive roller 152 is moved into engagement with the ink web W and sheet material S and applies of pressure P against the ink web and sheet material along a linear zone of contact directly on the line of laser impingement. In the same manner as the laser window 56 described above, the transmissive roller 152 is made of a material highly transmissive at the selected wavelength of the laser beam 42. Accordingly, for the preferred beam described herein (10.6 microns, 30 $W_{avg.}$), the roller 152 may be constructed, for example, of sodium chloride (NaCl) or zinc selenide (ZnSe).

As will be recognized by those skilled in the pertinent art, numerous changes and modifications may be made to the above-described and other embodiments of the present invention without departing from its scope as defined in the appended claims. For example, in larger-format systems, such as systems for printing large-width banners or bill boards, it may be desirable to construct the laser window assembly so that it is movable with the laser beam along the line of laser impingement. In this way, rather than constructing a large-width window assembly, a smaller window assembly may be synchronously driven in the y-coordinate direction with the scanning device to press the ink web into engagement with the sheet material and roller platen along the line of laser impingement, and thereby facilitate the transfer of ink from the web to the sheet for printing the graphic images. For relatively large-width graphic products, suitable beam flattening optics may be necessary to maintain substantially uniform beam intensity along the line of laser impingement. Similarly, numerous different mechanisms may be substituted for those described herein for adjusting and controlling the pressure P applied by the laser window to the ink web along the line of laser impingement, and for driving the sheet material and ink web between the platen and the window assembly. Accordingly, the detailed description of preferred embodiments herein is to be taken in an illustrative as opposed to a limiting sense.

What is claimed is:

1. An apparatus for printing graphic products on any of a plurality of types of sheet materials with any of a plurality of types of ink webs bearing ink, comprising:

a platen for supporting the sheet material with the ink web overlying and in turn supported by the sheet material;

a laser source for transmitting a beam of radiation at a predetermined wavelength into the ink web along a line of laser impingement on the ink web for heating and in turn transferring ink from the ink web to the sheet material in accordance with a printing program of image data for printing graphic images on the sheet material;

a laser window mounted over the platen for pressing the ink web against the sheet material and hence the sheet against the platen along the line of laser impingement to facilitate the transfer of ink from the web to the sheet material, the laser window being transmissive at the predetermined wavelength along the line of laser impingement to permit the beam of radiation to pass through the window and into the ink web and thereby print the graphic images on the sheet material; and means for controlling the laser for printing the graphic products on the selected sheet material, said means including means for selecting the level of radiation energy transmitted into the ink web based on at least one of the type of the ink web and the type of the sheet material for effecting a transfer of ink from the ink web to the sheet material.

2. An apparatus as defined in claim 1, further comprising means for controlling the pressure applied by the laser window against the ink web and sheet material along the line of laser impingement.

3. An apparatus as defined in claim 2, wherein the means for controlling the pressure applied by the laser window includes a pressure-regulating motor and a cam coupled between the pressure-regulating motor and the laser window, and wherein the laser window is movable toward and away from the platen depending upon the direction of rotation of the cam and motor.

4. An apparatus as defined in claim 1, wherein the laser window is at least approximately 70% transmissive at the predetermined wavelength along the line of laser impingement.

5. An apparatus as defined in claim 1, wherein the laser window is approximately 90% transmissive at the predetermined wavelength along the line of laser impingement.

6. An apparatus as defined in claim 1, further comprising means for resiliently mounting the laser window in engagement with the ink web along the line of laser impingement.

7. An apparatus as defined in claim 1, wherein the laser window includes a frame defining an elongated slot extending along the line of laser impingement for permitting passage of the beam of radiation through the slot and into the ink web.

8. An apparatus as defined in claim 7, wherein the laser window further comprises a window material which is at least 70% transmissive at the predetermined wavelength and which is disposed within the elongated slot and pressed into engagement with the ink web along the line of laser impingement.

9. An apparatus as defined in claim 1, wherein the laser window comprises a window material extending along the line of laser impingement selected from the group including zinc selenide and sodium chloride.

10. An apparatus as defined in claim 1, wherein the laser window comprises a roller rotatably mounted over the platen and extending along the line of laser impingement, and being transmissive at the predetermined wavelength along the line of laser impingement.

11. An apparatus as defined in claim 1, wherein the ink web comprises a backing material and a layer of ink superimposed over the backing material, and the backing material is at least approximately 70% transmissive at the predetermined wavelength.

12. An apparatus as defined in claim 1, wherein the predetermined wavelength of the beam of radiation is within the infrared.

13. An apparatus as defined in claim 1, wherein the sheet material is a polymer sheet and the means for controlling selects the level of energy transmitted into the web by selecting the power of the beam of radiation to be within the range of approximately 25 to 30 watts.

14. An apparatus as defined in claim 1, wherein the sheet material is a polymer sheet and the means for controlling selects the level of energy transmitted into the web by selecting the pulse width of the beam of radiation to be within the range of approximately 50 to 250 ms.

15. An apparatus as defined in claim 1, further comprising a computer coupled to the laser source and including a data base within which the printed and cut features of a graphic product are commonly based.

16. An apparatus as defined in claim 15, further comprising a cutting apparatus coupled to the computer for cutting the graphic images from the sheet material.

17. A method for printing graphic products on any of a plurality of different types of sheet materials, with any of a plurality of different types of ink webs, wherein a sheet material to be printed upon is supported on a platen and an ink web for supplying ink overlies the sheet material on the platen for transferring ink onto the sheet material, comprising the following steps:

selecting a sheet material of one of the plurality of different types of sheet materials to print graphic products on;

selecting an ink web of one of the plurality of different types of ink webs;

selecting the level of radiation energy to be transmitted into the selected ink web based on at least one of i) the type of the selected sheet material and ii) the type of the selected ink web to effect a transfer of ink from the selected ink web to the selected sheet material and thereby print the graphic products on the selected sheet material;

transmitting a laser beam of radiation having a predetermined wavelength through a laser window and into the ink web to achieve the selected level of radiation energy in the ink web along a line of laser impingement on the ink web for heating and transferring ink from the selected ink web to the selected sheet material; and pressing the laser window into engagement with the selected ink web to press the ink web against the selected sheet material and the selected sheet material against the platen along the line of laser impingement to facilitate the transfer of ink from the selected ink web to the selected sheet material, wherein the laser window is transmissive at the predetermined wavelength of the beam of radiation along the line of laser impingement to permit the beam of radiation to pass through the window and into the selected ink web and thereby print graphic images on the selected sheet material.

18. A method as defined in claim 17, further comprising the step of controlling the pressure applied by the laser window against the ink web and sheet material along the line of laser impingement based on at least one of the type of the selected sheet material and the type of the selected ink web to effect a transfer of ink from the web to the sheet material.

19. A method as defined in claim 17, wherein the laser window is at least approximately 70% transmissive along the line of laser impingement at the predetermined wavelength.

20. A method as defined in claim 17, wherein the predetermined wavelength is within the infrared.

21. A method as defined in claim 17, wherein the step of selecting includes selecting the pulse width of the beam of radiation.

22. A method as defined in claim 17, wherein the step of selecting the sheet material includes the step of selecting a sheet material having feed holes spaced relative to each other and adjacent to at least one edge of the selected sheet material, and further including the steps of:

engaging the feed holes of the sheet material with at least one rotatable sprocket;

tracking the rotational position of the at least one sprocket so as to track the position of the sheet material engaged by the sprocket; and controlling the transmission of the beam of radiation based on the rotational position of the at least one sprocket and in turn printing the graphic products on the sheet material engaged by the sprocket.

23. A method as defined in claim 22, wherein the step of tracking the rotational position includes sensing the rotational position of the sprocket with a positional sensor and generating a positional signal representative of the rotational position, and wherein the step of controlling the transmission of the laser radiation includes controlling the transmission in response to the positional signal.

24. A method as defined in claim 17, wherein the step of selecting includes selecting the level of energy based on both the type of the selected sheet material and the type of the selected ink web.

25. A method as defined in claim 17, wherein the step of selecting the level of energy to be transmitted into the ink web includes selecting at least one of the power of the laser and the pulse width of the laser beam of radiation.

26. A method as defined in claim 25, further including the step of controlling the pressure with which the laser window engages the selected ink web during the printing of the selected sheet material to thereby control at least one of the intensity and the tone of the graphic images.

27. An apparatus as defined in claim 1, wherein the selected sheet material defines a plurality of holes spaced relative to each other along at least one marginal portion of the sheet material, and the apparatus further includes:

a sprocket rotatably mounted on the apparatus and including a plurality of sprocket pins for engaging the feed holes of the selected sheet material and rotating with movement of the sheet material; and wherein the means for controlling is coupled to the sprocket for controlling the transmission of the laser radiation based on the rotational position of the sprocket to thereby register the beam of radiation with the sheet material.

28. An apparatus as defined in claim 27, further including a positional sensor for tracking the rotational position of the sprocket and for generating positional signals representative thereof; and wherein the means for controlling is in electrical communication with the positional sensor for coupling to the sprocket and controlling the transmission of the beam of radiation in response to the positional signals of the sensor.

29. An apparatus as defined in claim 1, wherein said means for controlling selects the level of energy by selecting at least one of the pulse width of the laser radiation and the power of the laser.

30. An apparatus as defined in claim 29, wherein said means for controlling includes:

a programmable pulse generator for controlling the pulse width of the laser beam of radiation transmitted into the ink web; and a computer coupled to the laser, said means for selecting including program means for execution on said computer for selecting the pulse width of the laser beam in accordance with the type of the ink web, said programmable pulse generator controlling the pulse in response to said program means.

31. An apparatus as defined in claim 29, wherein the program means selects the pulse width of the laser beam based on the type of the selected ink web in an inverse relationship to at least one of the transmissivity of any backing included on the ink web and the absorption by the ink web of the laser beam.

* * * * *